United States Patent
Abdul et al.

(10) Patent No.: US 9,977,850 B2
(45) Date of Patent: May 22, 2018

(54) CALLBACK BASED CONSTRAINT PROCESSING FOR CLOCK DOMAIN INDEPENDENCE

(71) Applicant: International Business Machines Corporation, Armonk, NY (US)

(72) Inventors: Naiju K. Abdul, Bangalore (IN); Adil Bhanji, Wappingers Falls, NY (US); Hemlata Gupta, Hopewell Junction, NY (US); Kerim Kalafala, Rhineback, NY (US); Alex Rubin, San Jose, CA (US); Manish Verma, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/207,898

(22) Filed: Jul. 12, 2016

(65) Prior Publication Data
US 2018/0018421 A1    Jan. 18, 2018

(51) Int. Cl.
*G06F 17/50* (2006.01)

(52) U.S. Cl.
CPC ...... *G06F 17/5031* (2013.01); *G06F 17/5081* (2013.01); *G06F 2217/62* (2013.01); *G06F 2217/84* (2013.01)

(58) Field of Classification Search
CPC ............ G06F 17/5081; G06F 2217/84; G06F 2217/62; G06F 17/5031
See application file for complete search history.

(56) References Cited

U.S. PATENT DOCUMENTS

| | | | |
|---|---|---|---|
| 6,473,881 B1 * | 10/2002 | Lehner | G06F 17/5068 703/14 |
| 6,539,522 B1 | 3/2003 | Devins et al. | |
| 6,928,630 B2 * | 8/2005 | Moon | G06F 17/5031 716/134 |
| 7,047,163 B1 * | 5/2006 | Chakraborty | G06F 17/5045 703/2 |

(Continued)

OTHER PUBLICATIONS

N.A., "Method of applying a callback mechanism to enable correct processing of complex order dependent contraints", 1 page, retrieved May 2, 2016, retrieved from the Internet http://priorart.ip.com/IPCOM/000235772.

*Primary Examiner* — Naum B Levin
(74) *Attorney, Agent, or Firm* — Cantor Colburn LLP; Steven Meyers (57) ABSTRACT

A method, system and computer program product perform timing analysis of an integrated circuit design with callback-based constraint processing for clock domain independence. A timing graph representation of the integrated circuit design includes nodes interconnected by edges. Loading timing abstracts representing the nodes of the timing graph precedes obtaining a timing result based on propagating timing values and associated timing tags from an input to an output of the integrated circuit design and processing timing constraints at one or more of the nodes as callbacks. Each timing tag indicates a clock domain. After applying a design change, one or more modified timing tags that are added or changed as a result of the design change are determined. The timing constraints associated with the modified timing tags are processed as callbacks, and the timing result are re-computed.

19 Claims, 4 Drawing Sheets

(56) References Cited

U.S. PATENT DOCUMENTS

| | | | |
|---|---|---|---|
| 7,058,562 B2 * | 6/2006 | Powell | G06F 17/5022 703/16 |
| 7,257,524 B2 * | 8/2007 | Schilp | G06F 17/5022 703/14 |
| 7,356,451 B2 | 4/2008 | Moon et al. | |
| 7,581,201 B2 * | 8/2009 | Kazda | G06F 17/5068 716/113 |
| 8,578,310 B2 * | 11/2013 | Kalafala | G06F 17/5031 716/106 |
| 8,984,464 B1 * | 3/2015 | Mihal | G06F 17/5072 716/118 |
| 9,064,063 B1 | 6/2015 | Yu et al. | |

* cited by examiner

CALLBACK BASED CONSTRAINT PROCESSING FOR CLOCK DOMAIN INDEPENDENCE

BACKGROUND

The present invention relates to integrated circuit design, and more specifically, to callback-based constraint processing for clock domain independence.

The fabrication of an integrated circuit or chip includes several steps to finalize a logic design and analysis and physical implementation. The chip may be designed according to a hierarchical design methodology such that the chip is divided into cores or nests, with each core or nest divided into units that are further divided into macros. The logic design and component placement must result in a physical implementation that meets the timing requirements of the chip. To this end, design analysis (e.g., timing analysis, power analysis, noise analysis) is performed at different hierarchical levels and at different stages of design.

SUMMARY

Exemplary embodiments include a method, system, and computer program product to perform timing analysis of an integrated circuit design with callback-based constraint processing for clock domain independence. The method includes generating a timing graph representation of the integrated circuit design, wherein the timing graph includes nodes interconnected by edges; loading timing abstracts representing the nodes of the timing graph; obtaining a timing result based on propagating timing values and associated timing tags from an input to an output of the integrated circuit design and processing timing constraints at one or more of the nodes as callbacks, wherein each timing tag indicates a clock domain; applying a design change; determining one or more modified timing tags that are added or changed as a result of the design change; processing the timing constraints associated with the modified timing tags as callbacks; and re-computing the timing result.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As previously noted, design analysis such as timing analysis, power analysis, and noise analysis is performed to ensure that the physical implementation of a chip design will meet all requirements. For example, static timing analysis (STA) is generally performed to efficiently accomplish timing analysis without simulating the full integrated circuit. In STA, the chip design is represented as a timing graph with nodes indicating points (e.g., circuit elements) in the design where timing information is desired and edges, which are connections between nodes, being represented as arcs. During timing analysis a one or more timing signals are propagated through the timing graph from an input side to an output side. At each node, timing values of interest (e.g., arrival time, slew, slack) are computed. In addition to these timing values, an associated tag is propagated. The tag indicates the clock (corresponding with one of the clock domains of the chip) associated with the timing values.

Multiple tags may propagate simultaneously through a given edge or to a given node in the timing graph, and multiple sets of timing values with their associated tags may be stored on a given edge or node. For example, different timing values and corresponding tags may be associated with test vs. functional clocks. STA is performed at different stages of the design, but analyzing the entire chip design at every stage is inefficient in terms of run-time. Instead, a hierarchical design methodology is used and timing analysis is performed at different hierarchical levels (e.g., core, unit, macro) based on the needs at any given design stage. This hierarchical design methodology may be used for other types of design analysis, as well.

A macro may be a single logic gate or a collection of transistors or gates interconnected with wires and designed to perform a certain task. Detailed analysis may be performed at the macro level. For example, macros may be timed using accurate timing analysis techniques that include transistor level timing tools or gate level timing tools. This type of detailed analysis may be followed by generation of abstract models that represent the relevant characteristic of the macro in a simplified form. For example, a macro timing abstract represents timing characteristics in a simplified form. The generation of abstract models may be referred to as abstraction, performed by an abstractor. At higher levels (e.g., unit level, core level), macros are represented by abstracts for purposes of performing the analysis. A unit comprised of several macros, each associated with abstracts, may itself be abstracted. Thus, for purposes of discussing abstracts, macro may generally refer to any component that is abstracted. Because macros are reused in different parts of the chip design at different levels of hierarchy, the same macro may be part of different clock domains.

Some of the nodes of the timing graph of a timing abstract may be associated with timing constraints. A constraint refers to a modification or other control exerted based on the incoming timing signal. An exemplary constraint is the adjustment of the arrival time at a node by a specified value, based on the incoming signal at the node being a functional signal. While executing a STA run includes propagating timing values and tags from one side (an input side) to the other side (an output side), a timing constraint may specify modifying the timing at the node with the constraint, at a node toward the output side from the node with the constraint, or at a node toward the input side from the node with the constraint. In fact, some constraints may be in the form of loops between macros.

Thus, the traditional approach of loading and executing each macro, one-at-a-time, creates issues. Traditionally, in addition to the timing signal being propagated from the input side to the output side as each timing abstract of each macro is loaded, the constraints of the loaded macro are executed (prior to the next macro being loaded). Specifically, after the hierarchical chip design is loaded and the timer is set up, the top-level (e.g., unit level) constraints are loaded and executed, and then, as each macro is loaded, lower-level (e.g., macro level) constraints are executed. Top-level constraints refer to constraints associated with the netlist that specifies the interconnection among lower-level components (e.g., macros 125), while lower-level constraints refer to constraints associated with nodes of the lower-level components (e.g., macros 125).

When the constraint in a loaded macro is associated with a timing signal from a macro that is not yet loaded, the constraint is not properly processed. For example, a clock created by macro A (e.g., macro A contains an output port with a timing value tagged with an internally generated clock) may be killed at macro B according to a constraint at a node within macro B. However, if macro B is loaded (and its constraints executed) before macro A is loaded, there will be no corresponding timing value propagated with a tag corresponding to the internally generated clock within macro A, which subsequently needs to be to killed according to the constraint in downstream macro B. Further, once macro A is loaded and executed and the clock is created, the timing signal from macro A will not be killed. This order dependency problem or problem arising from the order in which macros are loaded can clearly result in errors in the timing analysis that are independent of the design being tested.

A prior approach to addressing this order dependency has been manual analysis of the timing results or manual specification of the order of loading of the macro-level timing abstracts. However, such manual intervention can be inefficient and tedious.

Another approach to addressing order dependency has been callback-based constraint processing. According to this approach, timing abstracts are loaded but not processed immediately after loading. Instead, the constraints are tagged as callbacks, and once the entire design (of the hierarchical level being analyzed) has been loaded, timing is propagated and the callbacks are processed from the input side to the output side.

While the callback approach addresses order dependency, it does not address design changes that affect the clock distribution network. If callbacks are not re-executed following these types of design changes, the design changes will not properly be reflected in the resulting timing analysis.

Turning now to an overview of the present disclosure, one or more embodiments relate to re-application of callbacks, as needed, based on design changes. As detailed below, only those callbacks that are associated with design elements in the fan-out cone of changed nodes are re-applied. Specifically, re-application of callbacks is only needed with the tags, which indicate the clock domain, are changed as a result of the design change. Based on the selective re-application of callbacks to address changes in the network that result from design changes, the abstracts are made clock domain independent. The chip design may be regarded as a clock network, which distributes the clock signals of the chip, and a data path, which is associated with the logical operations performed by the chip. Changes within the clock network (the clock tree distribution elements) or changes within the data path may result in changes (additions or deletions) to the set of tags that are propagated.

Figure 1:
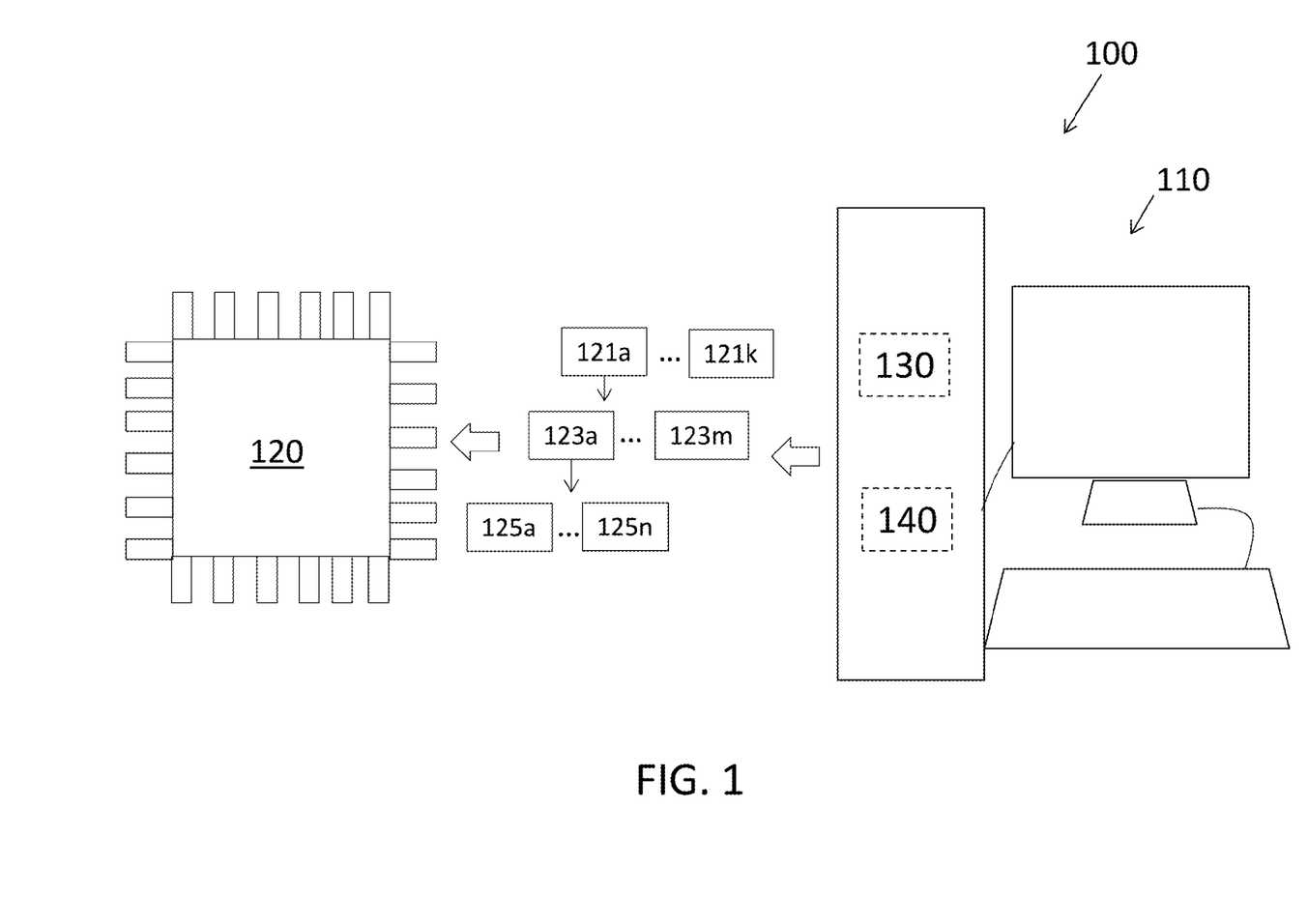
FIG. 1 is a block diagram of a system according to embodiments of the invention.

Turning now to a more detailed description of one or more embodiments, FIG. 1 is a block diagram of a system 100 according to embodiments of the invention. The system 100 includes a processing system 110 used to design an integrated circuit and the resulting physical implementation of the integrated circuit or chip 120. The hierarchical organization of the chip 120 is shown in FIG. 1 as including cores 121, units 123, and macros 125. Exemplary cores 121*a* through 121*k* are shown. Core 121*a* is shown to include units 123*a* through 123*m*, and unit 123*a* is shown to include macros 125*a* through 125*n*. Different cores 121 may include different numbers of units 123, and different units 123 may include different numbers of macros 125. The processing system 110 includes one or more memory devices 130 and one or more processors 140. Multiple of the processors 140 may be used in the callback-based constraint processing detailed below. The memory device 130 stores instructions implemented by the processor 140. As further discussed, these instructions include processes used to generate callbacks from the constraints and re-apply the constraints based on triggers that are further discussed below.

Figure 2:
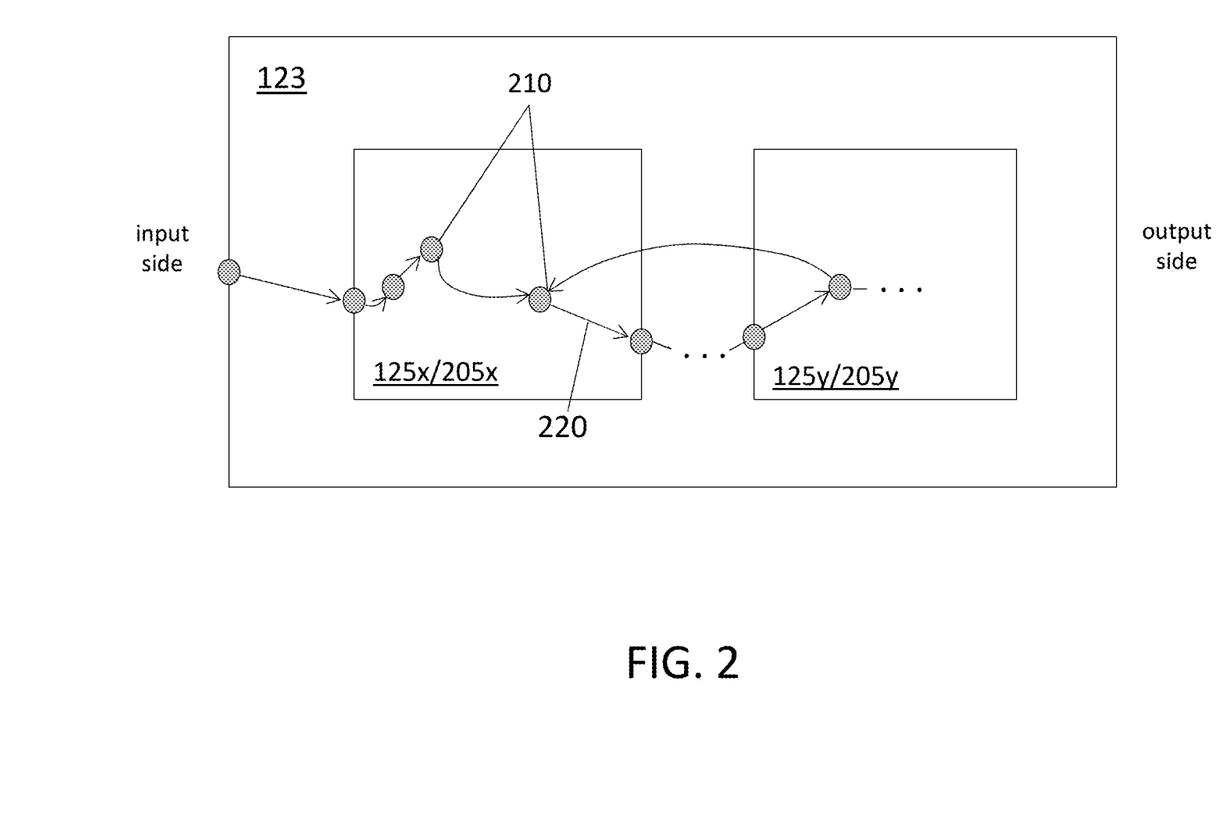
FIG. 2 shows exemplary timing abstracts that undergo callback-based constraint processing according to one or more embodiment.

FIG. 2 shows exemplary timing abstracts 205 that undergo callback-based constraint processing according to one or more embodiment. The portion of the hierarchical design shown in FIG. 2 includes a core 123 with two macros 125-*x* and 125-*y*. Nodes 210 within the timing abstracts 205*x*, 205*y* respectively associated with the macros 125*x*, 125*y* are shown, as well as timing arcs 220. As noted previously, prior methods of performing timing analysis include loading the timing abstract 205*x* for macro 125*x* and executing any constraints associated at nodes 210 of macro 125*x* prior to loading the timing abstract 205*y* for macro 125*y*.

As part of the one or more embodiments of the invention, the timing abstracts 205*x*, 205*y* for the macros 125*x*, 125*y* are loaded, along with all other timing abstracts needed for the hierarchical timing run, prior to any constraint processing. The constraints associated with nodes 210 are converted to callbacks. Initially, after all the top-level (e.g., unit 123 level) and lower-level (e.g., macro 125 level) constraints are loaded, the callbacks are processed from the input side to the output side as the tags and timing values of interest propagate through the design and the nodes 210 associated with the constraints are reached. According to one or more embodiments, these callbacks are processed again, as needed, based on design changes that affect one or more tags. That is, when a clock domain indicated by one or more tags changes as a result of a design change, the constraints (handled as callbacks) that are affected by the change must be re-processed. By re-applying constraints to account for changes affecting an associated tag, the callback-based constraint processing is made clock domain independent. This is because changes in design that result in changes to the clock domain in any portion of the design are handled by the callback-based timing analysis according to one or more embodiments.

Figure 3:
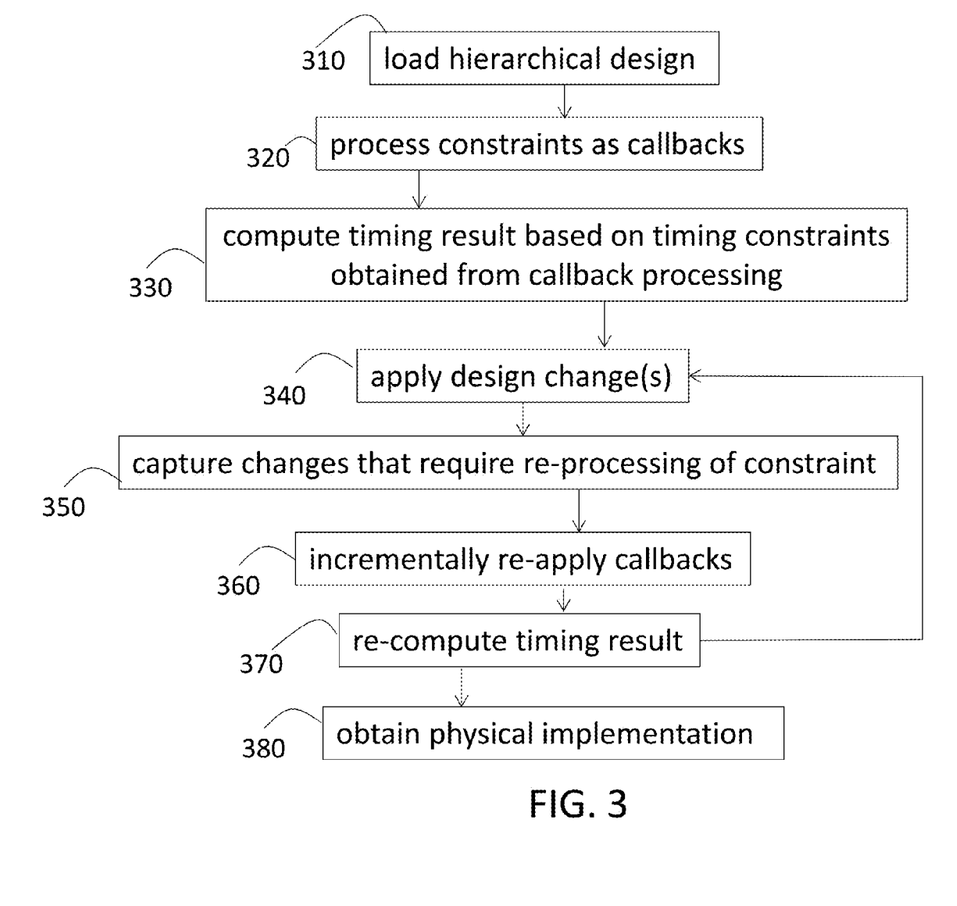
FIG. 3 is a process flow of a method of performing timing analysis with callback-based constraint processing according to embodiments of the invention.

FIG. 3 is a process flow of a method of performing callback-based constraint processing for clock domain independence according to embodiments of the invention. While the exemplary process flow specifies hierarchical timing analysis at the unit 123 level using lower-level macro 125 timing abstracts, any collection of components of the integrated circuit 120 may be analyzed using callbacks as discussed herein. Loading a hierarchical design, at block 310, uses the timing graph and includes loading the timing abstracts 205 and setting up the timer for the timing run. These processes are part of conventional timing analysis flow, and separating the loading and processing aspects addresses the order dependency among constraints.

At block 320, processing constraints as callbacks is done after all the macros 125 have been loaded (at block 310). That is, once all the timing abstracts 205 have been loaded, propagating tags and timing values and triggering callbacks, as their associated nodes 210 are reached, is performed at block 320. Propagating tags and timing values refers to computing arrival time, delay, and other values of interest in or between the various nodes 210 in the timing graph and associating a tag, which indicates the clock domain, with the timing values.

At block 330, computing the timing result based on timing constraints obtained from callback processing refers to determining timing slack and other parameters of interest in the design based on propagating the timing signal. Applying one or more design changes, at block 340, refers to design changes that may have been performed based on the timing result (computed at block 330). Design changes may be made for other reasons, as well, including changes to address other parameters such as power or noise.

The design changes of particular interest with regard to one or more embodiments are changes that affect the tags that propagate throughout the design (i.e., the clock domain indicated by the tags). These changes include additions or deletions of clock phases such as adding or modifying multiplex functionality in the clock distribution network. Multiplex functionality refers to a select input at a node 210 that selects an output signal from among two or more multiplexed input signals. If a design change adds a clock phase (clock domain) as one of the multiplexed inputs, the tag associated with the node 210 output is potentially changed. The design changes also include modification of a delay value within the clock distribution network. For example, a known optimization technique is known as "useful skew scheduling" involves the modification of clock delay in order to improve timing characteristics.

The processes involved in capturing the changes that require re-processing of constraints in the form of reapplying callbacks, at block 350, are detailed with reference to FIG. 4. As described, capturing the changes may include maintaining an incremental timing tag invalidation list (i.e., a list of timing graph edges which are impacted as a result of design changes).

At block 360, incrementally re-applying callbacks is performed based on the incremental timing tag invalidation list, as discussed with reference to FIG. 4. For example, if the list indicates that a tag was added or removed at a particular location (node 210) within the timing graph, callbacks would be reapplied on all nodes 210 in the fan-out cone of the changed location. The result of re-applying callbacks at block 360 is a set of incrementally updated timing constraints. In the context of this specification, incremental behavior implies that callbacks are re-executed based upon the nodes/edges for which a change in the set of tags is detected. This re-application, as needed, facilitates time domain-independence of constraint processing. Re-computing the timing result, at block 370, is based on the updated timing constraints. Based on the timing result and whether it indicates that timing requirements are met, the processes at blocks 340 through 370 may be repeated. At block 380, obtaining a physical implementation of the chip 120 includes manufacturing the chip 120 after all the design changes and analyses are completed.

Figure 4:
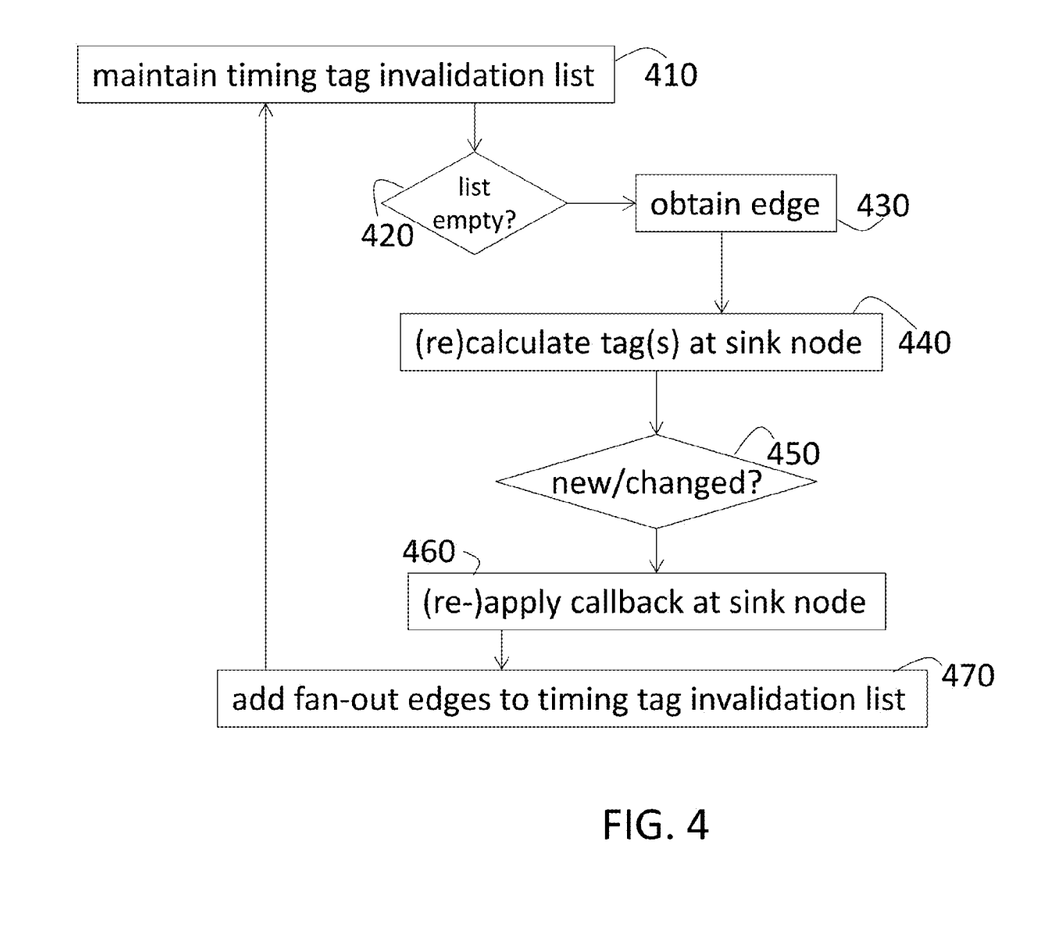
FIG. 4 details the processes involved in capturing design changes that require re-processing of a constraint and incrementally re-applying callbacks according to an exemplary embodiment.

FIG. 4 details the processes involved in capturing design changes that require re-processing of a constraint and incrementally re-applying callbacks according to an exemplary embodiment. That is, the processes 410 through 470 together detail an exemplary embodiment for implementing the processes 350 and 360 that are described with reference to FIG. 3. In the context of timing analysis, incremental design changes include an addition of an edge in the timing graph (e.g., based on adding a circuit element to the design), a deletion of an edge, or a modification of an edge value.

Some design changes may result in combinations of those types of changes. For example, when a buffer is added to improve the electrical characteristics of a wire, the change may include removal of an existing wire, which corresponds with the deletion of an edge in the timing graph, the addition of a buffer and wiring of the buffer, which corresponds to the addition of multiple edges, and changes in delay values in upstream and downstream edges because of the changes in electrical load and slew. The processes detailed herein capture the associated changes to tags that trigger reapplication of callbacks at affected nodes 210. Specifically, an incremental timing tag invalidation list is maintained. The list is populated with a set of added or deleted edges as design changes are made. Subsequently, when a timing value (e.g., slack) is needed, timing analysis is repeated with reapplication of encountered callbacks only as needed.

At block 410, maintaining the timing tag invalidation list is based on design changes (at block 340) and refers to populating the list with added or deleted edges. When a determination is made, at block 420, that there is an edge in the timing tag invalidation list, obtaining the next edge in the list, at block 430, starts an iteration of the processes. At block 440, the processes include calculating or recalculating one or more tags at the sink node 210 of the edge (obtained at block 430). The process may include calculating, rather than re-calculating, because the edge (obtained at block 430) may be added such that the sink node 210 of the edge may be new. As noted previously, a given node 210 may be associated with more than one tag, because more than one clock domain may affect the timing values at a given node 210.

At block 450, it is determined whether any calculated tag value (at block 440) is new or has changed from its original value. If this is the case, then applying (in the case of a new sink node 210) or re-applying a callback at the sink node 210 is performed at block 460. In addition, adding fan-out edges of the sink node 210 to the timing tag invalidation list is performed at block 470. The processes at block 430 through 470 are performed until every edge in the timing tag invalidation list has been processed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment of the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of performing timing analysis of an integrated circuit design with callback-based constraint processing for clock domain independence, the method comprising:
    generating a timing graph representation of the integrated circuit design, wherein the timing graph includes nodes interconnected by edges;
    loading timing abstracts representing the nodes of the timing graph;
    obtaining, using a processor, a timing result based on propagating timing values and associated timing tags from an input to an output of the integrated circuit design and processing timing constraints at one or more of the nodes as callbacks, wherein each timing tag indicates a clock domain;
    applying a design change;
    determining, using the processor, one or more modified timing tags that are added or changed as a result of the design change;
    processing the timing constraints associated with the modified timing tags as callbacks;
    re-computing the timing result; and
    manufacturing a physical implementation of the integrated circuit based on the timing analysis.

2. The method according to claim 1, wherein the applying the design change includes adding or deleting one or more of the edges.

3. The method according to claim 1, wherein the determining the one or more modified timing tags includes maintaining an incremental timing tag invalidation list based on the applying the design change, the incremental timing tag invalidation list including a list of modified edges that are added or deleted as a result of the applying the design change.

4. The method according to claim 3, wherein the determining the one or more modified timing tags includes examining the timing tag associated with a sink node of one of the modified edges in the incremental timing tag invalidation list.

5. The method according to claim 4, wherein the determining the one or more modified timing tag includes identifying the sink node of the one of the modified edges as being added based on the design change or determining that the timing tag associated with the sink node of the one of the modified edges is changed based on the design change.

6. The method according to claim 5, wherein the determining the one or more modified timing tags includes adding the timing tags of the nodes that fan out from the sink node of the one of the modified edges to the incremental timing tag invalidation list.

7. A system to perform timing analysis of an integrated circuit design with callback-based constraint processing for clock domain independence, the system comprising:
    a memory device configured to store a timing graph representation of the integrated circuit design, wherein the timing graph includes nodes interconnected by edges; and
    a processor configured to load timing abstracts representing the nodes of the timing graph, obtain a timing result based on propagating timing values and associated timing tags from an input to an output of the integrated circuit design and processing timing constraints at one or more of the nodes as callbacks, wherein each timing tag indicates a clock domain, apply a design change, determine one or more modified timing tags that are added or changed as a result of the design change, process the timing constraints associated with the modified timing tags as callbacks, and re-compute the timing result, wherein a physical implementation of the integrated circuit design based on the timing analysis is manufactured.

8. The system according to claim 7, wherein the processor adds or deletes one or more of the edges to apply the design change.

9. The system according to claim 7, wherein the processor determines the one or more modified timing tags based on maintaining an incremental timing tag invalidation list based on the applying the design change, the incremental timing tag invalidation list including a list of modified edges that are added or deleted as a result of the applying the design change.

10. The system according to claim 9, wherein the processor determines the one or more modified timing tags based on examining the timing tag associated with a sink node of one of the modified edges in the incremental timing tag invalidation list.

11. The system according to claim 10, wherein the processor determines the one or more modified timing tags based on identifying the sink node of the one of the modified edges as being added based on the design change or determining that the timing tag associated with the sink node of the one of the modified edges is changed based on the design change.

12. The system according to claim 11, wherein the processor determines the one or more modified timing tags based on adding the timing tags of the nodes that fan out from the sink node of the one of the modified edges to the incremental timing tag invalidation list.

13. The system according to claim 12, wherein the processor determines, incrementally, whether the timing tags of the nodes that fan out from the sink node of the one of the modified edges are among the one or more modified timing tags.

14. A computer program product for performing timing analysis of an integrated circuit design with callback-based constraint processing for clock domain independence, the computer program product comprising a computer readable storage medium having program instructions embodied therewith, the program instructions executable by a processor to perform a method comprising:

generating a timing graph representation of the integrated circuit design, wherein the timing graph includes nodes interconnected by edges;

loading timing abstracts representing the nodes of the timing graph;

obtaining a timing result based on propagating timing values and associated timing tags from an input to an output of the integrated circuit design and processing timing constraints at one or more of the nodes as callbacks, wherein each timing tag indicates a clock domain;

applying a design change;

determining one or more modified timing tags that are added or changed as a result of the design change;

processing the timing constraints associated with the modified timing tags as callbacks; and re-computing the timing result, wherein a physical implementation of the integrated circuit based on the timing analysis is manufactured.

15. The computer program product according to claim 14, wherein the applying the design change includes adding or deleting one or more of the edges.

16. The computer program product according to claim 14, wherein the determining the one or more modified timing tags includes maintaining an incremental timing tag invalidation list based on the applying the design change, the incremental timing tag invalidation list including a list of modified edges that are added or deleted as a result of the applying the design change.

17. The computer program product according to claim 16, wherein the determining the one or more modified timing tags includes examining the timing tag associated with a sink node of one of the modified edges in the incremental timing tag invalidation list.

18. The computer program product according to claim 17, wherein the determining the one or more modified timing tag includes identifying the sink node of the one of the modified edges as being added based on the design change or determining that the timing tag associated with the sink node of the one of the modified edges is changed based on the design change.

19. The computer program product according to claim 18, wherein the determining the one or more modified timing tags includes adding the timing tags of the nodes that fan out from the sink node of the one of the modified edges to the incremental timing tag invalidation list.

* * * * *